Aug. 24, 1943.    J. SLEPIAN    2,327,971
POWER TRANSLATING DEVICE
Filed Dec. 13, 1923    6 Sheets-Sheet 1
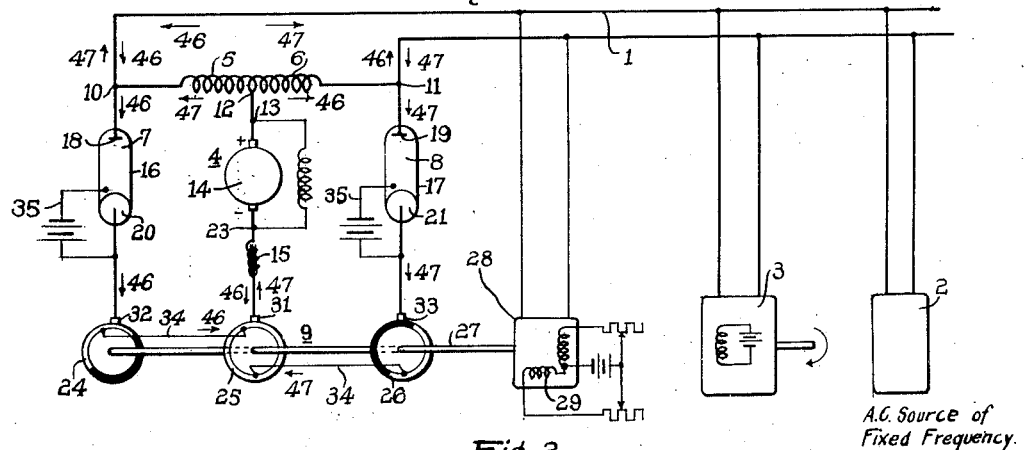
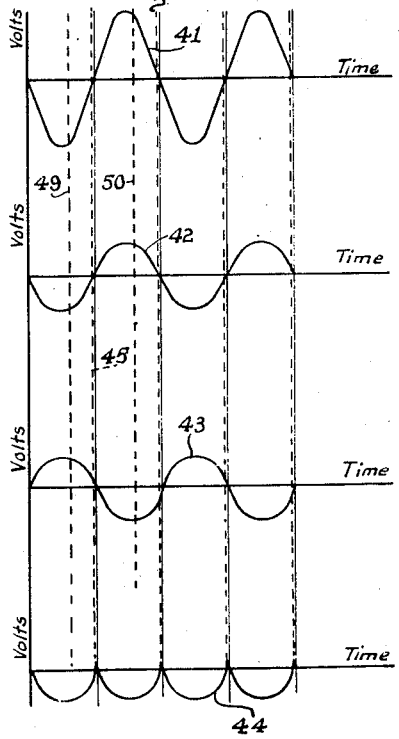
WITNESSES:
A.G. Schiefelbein
S. M. Pineles
INVENTOR
Joseph Slepian.
BY
Wesley G. Carr
ATTORNEY Aug. 24, 1943.  J. SLEPIAN  2,327,971
POWER TRANSLATING DEVICE
Filed Dec. 13, 1923  6 Sheets-Sheet 2

WITNESSES:
A.G. Schiefelbein.
S. M. Pinele

INVENTOR
Joseph Slepian.
BY
Wesley G. Carr
ATTORNEY

Aug. 24, 1943.　　J. SLEPIAN　　2,327,971
POWER TRANSLATING DEVICE
Filed Dec. 13, 1923　　6 Sheets-Sheet 3

WITNESSES:
A. G. Schiefelbein.
S. M. Pineles

INVENTOR
Joseph Slepian.
BY
Wesley G. Carr
ATTORNEY

Aug. 24, 1943.  J. SLEPIAN  2,327,971
POWER TRANSLATING DEVICE
Filed Dec. 13, 1923  6 Sheets-Sheet 4

INVENTOR
Joseph Slepian.

Aug. 24, 1943.   J. SLEPIAN   2,327,971
POWER TRANSLATING DEVICE
Filed Dec. 13, 1923   6 Sheets-Sheet 6
Fig. 10.
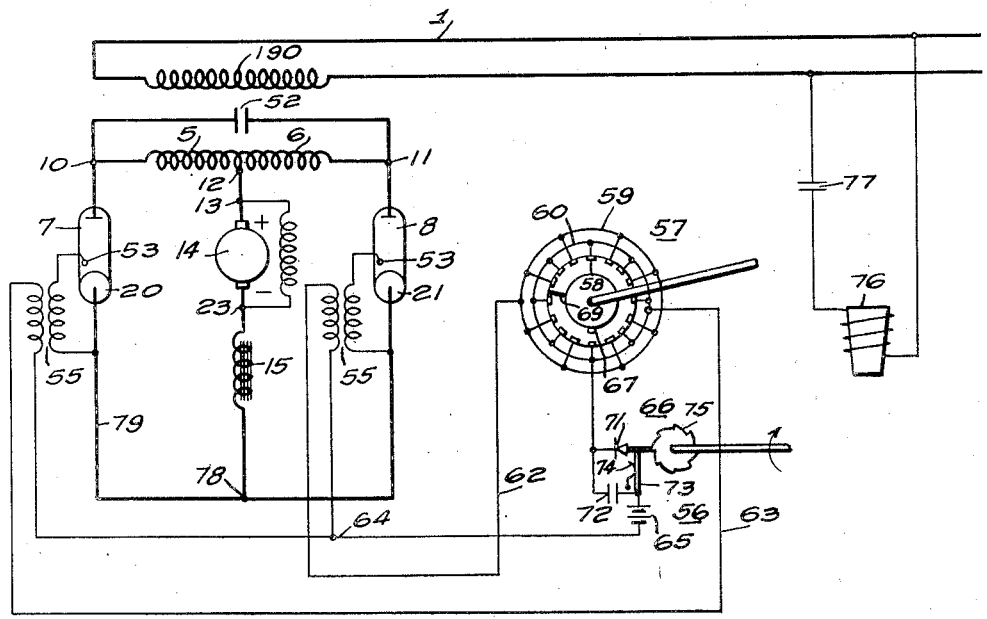
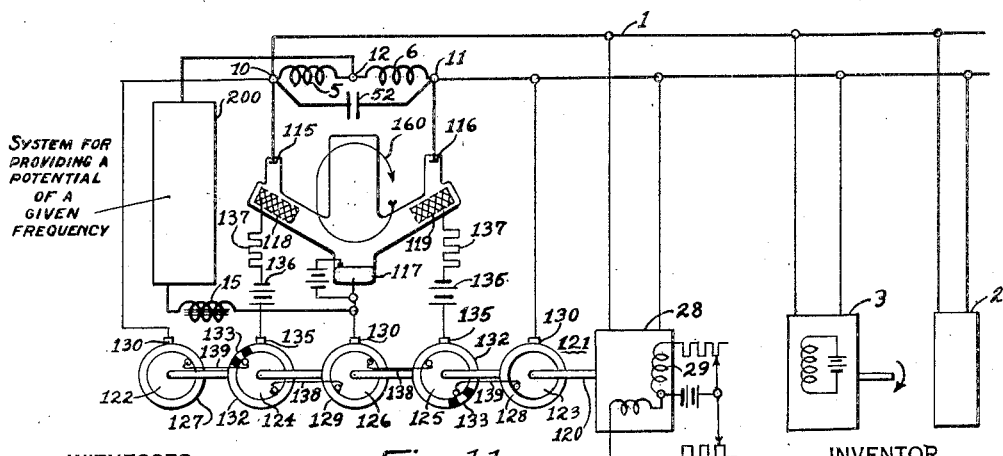
Fig. 11
WITNESSES:
E. A. McCloskey
Wm. C. Groome
INVENTOR
Joseph Slepian.
BY F. W. Lyle
ATTORNEY

Patented Aug. 24, 1943

2,327,971

UNITED STATES PATENT OFFICE 2,327,971

POWER TRANSLATING DEVICE

Joseph Slepian, Wilkinsburg, Pa., assignor to Westinghouse Electric & Manufacturing Company, a corporation of Pennsylvania Application December 13, 1923, Serial No. 680,396

82 Claims. (Cl. 175—363)

My invention relates to electric translating apparatus and it has particular relation to translating apparatus utilizing rectifiers for converting electric power of one frequency to another.

One object of my invention is to provide improved apparatus comprising rectifiers for translating direct current into alternating current.

A more specific object of my invention is to provide improved means for utilizing mercury-arc rectifiers for translating direct current to alternating current.

A further object of my invention is to provide control apparatus which is particularly adapted for application to mercury-arc rectifiers utilized in translating power from one frequency to another.

In Patent No. 1,347,894 to L. W. Chubb, granted July 27, 1920, and assigned to the Westinghouse Electric and Mnaufacturing Company is described an organization utilizing two mercury-arc rectifier paths for converting direct current into alternating current.

My invention utilizes certain of the broad principles described in the above-named application and provides improved means for controlling the operation of the rectifiers in accordance with characteristic properties of the mercury arc.

Certain of the broad principles and arrangements which I have discovered and which relate to the use of rectifiers, and particularly mercury-arc rectifiers, for improving the commutation of electric machines and other purposes are described and claimed in my patents No. 1,802,677, issued April 28, 1931, and No. 1,810,033, issued June 16, 1931, both assigned to the Westinghouse Electric and Manufacturing Company. My Patent No. 2,088,490, issued July 27, 1937, and my application Serial No. 229,849, filed September 14, 1938, both assigned to that company, are, respectively, a division and a continuation-in-part of this application.

My present invention utilizes commutating electromotive forces, derived either from the power system or from auxiliary apparatus, to secure efficient operation of translating devices employing mercury-arc rectifiers for converting direct current into alternating current.

With the foregoing and other objects in view, my invention consists in the arrangements, circuits, and methods of operation described and claimed hereinafter and illustrated in the accompanying drawings, wherein Figure 1 is a diagrammatic view of a system utilizing two mercury-arc rectifiers and a commutating mechansm for supplying current to an alternating-current load system which is provided with means for maintaining a certain predetermined frequency thereon;

Fig. 2 is a diagram showing curves illustrating the relative phases of the voltages applied to the various elements of the apparatus illustrated in Fig. 1;

Fig. 10 is a modification of Fig. 4 with a two-coil transformer substituted for the auto-transformer disclosed; and Fig. 11 is a diagrammatic view showing a modification of Fig. 6.

Figure 3:
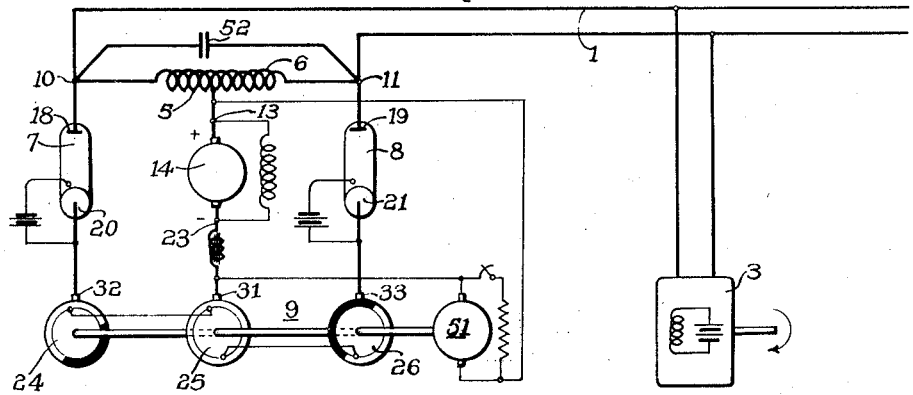
Fig. 3 is a diagrammatic view of a system similar to that illustrated in Fig. 1 and adapted to supply alternating current without the co-operation of means for maintaining a definite frequency in the load circuit.

In Figure 1 is shown an alternating-current system I to which are connected alternating-current generators 2 and alternating-current-load devices 3. Additional power is supplied to the alternating-current system I from a direct-current source 4 by means of a translating apparatus comprising two transformer windings 5 and 6, two mercury-arc rectifiers 7 and 8 and a motor-operated switching device 9.

Systems utilizing hot-cathode rectifiers for converting alternating current into direct current are well known. Attempts have been made to utilize such rectifiers for the inverted process of supplying alternating-current lines from direct-current sources. While all the numerous hot-cathode devices may be utilized for such purposes, it is preferred, in many instances, to employ mercury-arc rectifiers for rectification purposes as well as for the inverted process of supplying alternating current, on account of the better adaptability and higher efficiency of mercury-arc rectifiers for large power applications.

By proper manipulation of switch mechanisms or grid-control devices associated with space-current rectifiers, it is possible to so control the flow of a direct current as to convert the same into alternating current. Where mercury rectifier devices are utilized in such systems, special care has to be taken on account of the peculiar characteristics of such devices and, as far as possible, such characteristics should be turned to good advantage.

One of the characteristics of a mercury-arc device is that, while a current is flowing through the space device, the electrodes are maintained in a conductive state irrespective of the application of a current-blocking potential to many types of grid disposed in the path of the current flow. In other words, many types of mercury-arc rectifiers are almost entirely unaffected by controlling means such as are successfully used in other evacuated space-current devices.

I have found that the problems resulting from the application of grid-controlled mercury-arc rectifiers are very similar to the problems met in systems utilizing switching means in combination with rectifiers for converting direct current into alternating current.

Where switching means are used for directing the flow of current through rectifiers it is essential, for the continuity of the operation and the efficiency of the apparatus, that the switching means be opened during the periods when the rectifiers are without current, in order to avoid the destructive effect of the heavy arcs that would otherwise be present. Such conditions of arcless opening of the switching means require a definite relation between the phase of the voltage which is impressed upon the terminals of the translating apparatus and the periodical operation of the switching means for controlling the flow of the current. Indeed, the proper selection of such relation and the adoption of means for securing the same determine the operativeness of such apparatus.

In the embodiment shown in Fig. 1, the two transformer windings 5 and 6 have two end terminals 10 and 11, respectively, which are connected across the alternating-current system 1, and a common neutral terminal 12 which is connected to the positive terminal 13 of the direct-current source 4. The direct-current source is a shunt excited direct-current generator 14. A stabilizing inductance 15 may be connected in series therewith for maintaining approximately constant current flow from the generator independently of the changes in the circuit relations of the translating apparatus.

The mercury arc rectifiers 7 and 8 comprise evacuated envelopes 16 and 17, respectively, having anodes 18 and 19, respectively, and mercury cathodes 20 and 21, respectively. The anodes 18 and 19 are connected to the terminals 10 and 11, respectively, of the transformer windings 5 and 6.

The connection between the negative terminal 23 of the direct-current generator 14 and the cathodes 20 and 21 of the two mercury-arc rectifiers is accomplished by means of the rotating switching device 9 which comprises three annular contact members 24, 25 and 26 mounted upon a shaft 27 driven by a synchronous motor 28. The motor 28 is supplied from the alternating-current system 1 and may be excited by a two-phase exciting winding 29 for controlling the phase relation of the shaft 27 with respect to the alternations of the alternating-current system 1.

One contact member 25 is a slip ring which engages a brush 31 leading to the negative terminal 23 of the direct-current generator. The other two contact members 24 and 26 have conducting segments extending over approximately only half of their peripheries and engage brushes 32 and 33, respectively, leading to the mercury cathodes 20 and 21, respectively, of the rectifiers. The conducting portions of the peripheries of the contact members 24 and 26 are offset approximately 180 degrees and are connected, by means of conductors 34, to the contact member or slip-ring 25 leading to the negative terminal 23 of the direct-current generator.

When the shaft 27 makes a full rotation, the negative terminal of the direct-current source is connected, during one-half of the rotation, to the mercury-arc rectifier 7 leading to the end terminal 10 of the transformer winding 5. During the second half of the rotation, the negative terminal of the direct-current source is connected to the mercury-arc rectifier 8 leading to the end terminal 11 of the second transformer winding 6. During the intermediate periods of transition, the brushes 32 and 33 make and break contact with the conducting portions of their associated contact members 24 and 26, respectively, and provide a momentary closed-circuit connection between the negative terminal 23 of the direct-current generator 14 and the mercury cathodes 20 and 21 of both mercury-arc rectifiers 7 and 8.

Each mercury-arc rectifier is provided with a keep-alive circuit 35 for maintaining the mercury electrodes in an electron-emitting state during the entire operation of the translating apparatus.

In the operation of the apparatus illustrated in Fig. 1, the phase position of the shaft 27 with respect to the alternations of the alternating-current system 1 is such that the negative terminal of the direct-current source is connected to the mercury cathode of one or the other of the rectifiers during the period when the alternating-current voltage of the system impresses, upon the anode of the rectifier in question, a potential tending to send therethrough a current which is in opposite direction to that which is sent from the direct-current source. In order to obtain a flow of power from the direct-current source into the alternating-current system, the electromotive force tending to send the direct current must, of course, be larger than the electromotive force impressed by the alternating-current system tending to send a reversed current through the rectifier.

The operation of the translating device will be best understood by considering the sequence of the switching operations in connection with the curves illustrated in Fig. 2. Curve 41 represents the voltage applied by the alternating-current system 1 across the terminals 10 and 11 of the transformer windings 5 and 6 as a function of the time. Curve 42 represents the voltage across the transformer winding 5 between the terminals 10 and 12. Curve 43 represents the voltage of the transformer winding 6 between the terminals 11 and 12 as a function of the time. Curve 44 represents the voltage which is impressed by the alternating-current system 1 between the terminals 13 and 23 respectively of the direct-current source, as a result of the operation of the switching device 9, neglecting the voltage-drops in the rectifiers.

Assuming the shaft member 27 to be in the position illustrated in Fig. 1 and rotating counterclockwise, the brush 32 is in contact with the conducting portion of the contact member 24, and the brush 33 is in contact with the non-conducting portion of the contact member 26. This position corresponds to the period during which the circuit leading through the rectifier 7 is closed and that through the rectifier 8 is open, and extends in Fig. 2 until the time-point indicated by the dotted line 45.

A direct current flows from the positive terminal 13 of the direct-current generator to the common terminal 12 and there divides into two portions, one portion flowing directly through the transformer winding 5, and the other portion flowing through the second transformer winding 6 and the load devices 3 in the direction of the arrows 46, to the end terminal 10 leading to the anode 18 of the rectifier 7 and thence through brush 32, conductor 34 and contact member or slip-ring 25 to the negative terminal 23 of the generator.

During this period, the alternating-current system impresses upon the transformer windings the voltages indicated in the curves 42 and 43, Fig. 2. The voltage impressed upon the transformer winding 5 is opposed to the electromotive force sending the direct current therethrough and tends to send a reversed current through the conducting rectifiers 7, i. e., it opposes the flow of current therethrough. The voltage impressed upon the transformer winding 6 leading to the non-conducting rectifier 8 is so directed that, but for the open connection at the contact member 26, a current would be forced through the rectifier in the direction from the anode to the cathode, i. e., in the direction of the current flow from the direct-current generator 14.

In the course of rotation of the shaft 27 of the switching device, the brush 32 leading from the conducting rectifier 7 reaches the portion of the contact member 24 at which the connection of the negative terminal 23 of the generator is interrupted, and the brush 33 of the non-conducting rectifier 8 reaches the conducting portion of the contact member 26 and establishes a circuit connection to the negative terminal 23 of the generator. This moment corresponds to the time point indicated in Fig. 2 by the dotted line 45.

For a short period, while the conductive connections between the brushes 32 and 33 and the conductive portions of the respective contact members 24 and 26 exist simultaneously, a closed circuit is established between negative terminal 23 of the generator and the mercury cathodes 20 and 21, permitting the direct current to flow through either of the rectifiers. However, it will be noted, from Fig. 2, that the dotted line 45 does not exactly coincide with the node points of the voltages, but it passes through the curves at points slightly before the first node is reached, indicating that the transition point occurs slightly before the alternating-current voltage reaches zero.

By reason of the voltages induced in the transformer windings 5 and 6 by the alternating-current system 1, there exists, therefore, an electromotive force tending to reduce the current through the rectifier 7 and to initiate and aid the flow of current through the rectifier 8. I term this action the "commutating action" since it is analogous to a similar action obtained in the commutation of dynamo-electric machines utilizing an auxiliary electromotive force for commutating the current.

The commutating action of the voltage impressed by the alternating-current system thus co-operates closely with the switching device 9 and diverts the current from the rectifier 7, which had been conducting the current during the last half-period, to the rectifier 8 of which the circuit connections have just been established. The current in the former rectifier 7 is thus sparklessly interrupted when the brush 32 leaves contact with the conducting portion of the contact member 24. It is important, however, that the contact between the brush 32 and the conducting portion of the contact member 24 shall be entirely interrupted while the commutating action of the voltage of the alternating line 1 still persists, that is, before the voltage curves 42 and 43 pass through zero. This is accomplished by the proper choice of the width of the brushes 32 and 33 and the length of the conducting peripheral portions of the contact members 24 and 26.

The cycle just described is then repeated with the current flowing from the positive terminal 13 of the generator 14 to the common terminal 12, there dividing into one portion flowing directly through the transformer winding 6 and another portion flowing through the transformer winding 5 and the load devices 3, in the direction indicated by the arrows 47, to the end terminal 11 and thence through the rectifier 8 to the negative terminal 23 of the direct-current generator.

I am thus able to supply the alternating-current line from the direct-current source by means of the two mercury-arc rectifiers and a rather simple and inexpensive switching equipment. The switching equipment which is used to perform the operations described hereinbefore is not confined to the particular form illustrated in the drawings.

The translating device illustrated in Fig. 1 could not operate sparklessly without the assistance derived from the alternating-current voltage of the supply system 1 which commutates the currents from one of the rectifiers to the other, and such commutating operation is absolutely essential for the success of the translating apparatus, since there would not otherwise exist a tendency for the current to divert its path of flow from one of the rectifiers to the other.

The apparatus illustrated in Fig. 1 may also be employed as a rectifier supplying a direct-current load from an alternating-current source. By proper arrangement of the phase relation of the shaft 27, the direct-current voltage which is derived from the alternating-current system may be reduced to any desired value without the use of transformers. For instance, by so arranging the phase relation of the shaft 27 that the direct-current load which is derived from the terminals 13 and 23 is alternately connected to the rectifiers during the periods indicated in Fig. 2 by the lines 49 and 50, i. e., by causing the rectifier to be connected to the load at such times that it can carry current from the alternating-current system 1, during only a part of its half-cycle, the average voltage across the direct-current load may be proportionally reduced.

In Fig. 3 is shown an embodiment of my invention comprising certain of the elements shown in Fig. 1 and having additional means for effecting the commutation of the current from one rectifier to another independently of the commutating action of the load circuit. The switching device 9 is driven by a direct-current motor 51 which is supplied from the direct-current generator 14. Such an organization is capable of operation at any desired frequency, even though the frequency-determining alternator 2 is omitted, the frequency of the generated alternating current being then dependent only upon the speed at which the switching means are operated, that is upon the speed of the driving motor 51.

I accomplish such operation by providing a commutating condenser 52 which is connected between the end terminals 10 and 11 of the transformer windings and 5 and 6. As the circuit through the left-hand rectifier 7 is closed by means of the contact member 24 of the switching device 9, the condenser 52 is charged to a potential which is oppositely directed to the potential of the direct-current source. When the switching mechanism reaches the position of transition, connecting both mercury cathodes to the negative terminal 23 of the direct-current generator, the circuit including the condenser 52 and the two rectifiers 7 and 8 provides a closed path for the condenser to discharge in the direction from the anode 19 to the mercury cathode 21 in the rectifier 8, and thence through the rectifier 7, in a direction opposite to the previous current-flow therethrough, to the end terminal 10 on the other plate of the condenser.

The discharge of the condenser 52 is thus of assistance to the flow of current through the mercury-arc rectifier 8, but opposes the flow of current through the other rectifier 7 and is instrumental in diverting the current, which is supplied by the generator 14, from the mercury arc rectifier 7 to the mercury-arc rectifier 8. The action just described permits a sparkless separation of the brush 32 and the conducting segment of the switching member 24.

Figure 4:
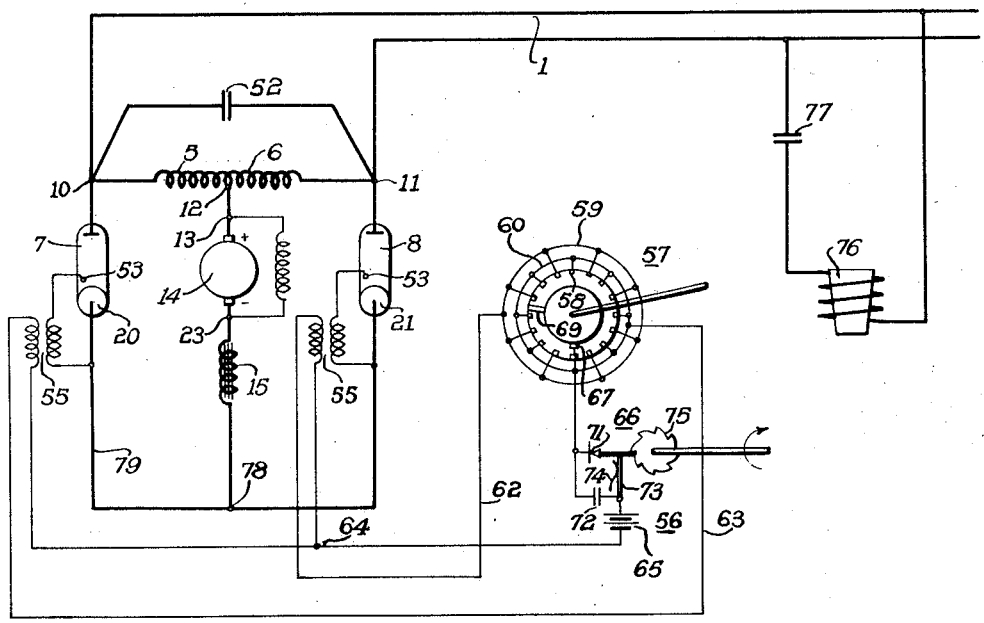
Fig. 4 is a diagrammatic view of a system similar to that illustrated in Fig. 3, wherein the flow of current through the mercury-arc rectifiers is controlled by the operation of an ignition device initiating the flow of current in the rectifiers.

In the modification shown in Fig. 4, the control of the current-flow through the rectifiers 7 and 8, respectively, is effected by utilizing the properties of mercury-arc rectifiers which are not separately excited to become non-conductive after the current therethrough has been reduced to zero or to a low value. To this end, I provide, for each rectifier, a starting electrode 53 which is actuated by means of an ignition transformer 55 having a secondary winding connected between the ignition electrode 53 and the mercury cathode of the rectifier and having a primary winding which is connected to a source 56 of pulsating direct current through a distributor 57.

The distributor 57 comprises a plurality of annularly disposed contact members 58 which are alternately connected to two bus conductors 59 and 60, respectively, which are connected by means of conductors 62 and 63 to proper terminals of the primary windings of the ignition transformers, the other terminals of the ignition transformers being connected to a common conductor 64 leading to one terminal of a battery 65 constituing the source of supply of the pulsating direct current.

The other terminal of the battery 65 is connected, through an interrupter 66 and a brush 67, to a distributor arm 69 which is rotated by a motor not shown in the drawings. The distributor arm 69 alternately makes contact with the several contact members 58 leading to the respective ignition transformers 55 and alternately starts the mercury arc rectifiers 7 and 8. The interrupter 66 consists of a pair of quick-break contacts 71 shunted by condenser 72. One of the contacts 71 is mounted upon a flexible arm 73 which is biased to an open position by a spring 74. A toothed cam 75 is rotated at a high speed and closes and releases the quick-break contacts 71 at a high rate.

The alternate closing and opening of the quick-break contacts 71 sends a pulsating direct current through the primary winding of the one or the other of the ignition transformers 55 during the short interval of the engagement of the distributer arm 69 with a contact member 58. The pulsating direct current induces a high potential in the secondary winding of the ignition transformers and impresses upon the starting electrode 53 a high unidirectional potential with respect to the mercury electrode causing a discharge therebetween. The asymmetric or unidirectional quality of the induced potential results from the quick interruption and the relatively slow establishment and building up of the current in the circuit including the interruptor 66.

The mercury rectifiers 7 and 8 are connected to the end terminals 10 and 11 of the two transformer windings 5 and 6 in the same manner as shown in Fig. 3, the transformer windings being shunted by the commutating condenser 52. An alternating-current load, such as an induction furnace 76 and comprising a serially connected condenser 77, is supplied through the line conductors 1, which are connected across the end terminals 10 and 11 of the transformer windings 5 and 6. The direct-current generator 14 is connected with its positive terminal 13 connected to a middle terminal 12 of the transformer windings 5 and 6, and with its negative terminal 23 connected through the stabilizing inductance 15 to an intermediate point 78 of a conductor 79 connecting the mercury electrodes 20 and 21 of the respective rectifiers 7 and 8.

The operation of the apparatus illustrated in Fig. 4 is very similar to that shown in Fig. 3, except that the control of the current flow through the rectifiers is effected by the operation of the starting electrodes 53. Assuming that a current is flowing from the positive terminal 13 of the direct-current source, dividing at the middle transformer terminal 12 into two portions, one portion flowing directly through the transformer winding 5, and the other portion flowing through the transformer winding 6 and the load circuit 1 to the end terminal 10, the current then flows through the rectifier 7 and the conductor 79 to the negative terminal 23 of the direct-current generator 14. The distributing arm 69 is in the position shown in the drawings. The commutating condenser 52 is charged to a potential corresponding to the direction of flow of current into the load, that is, opposite to the voltage impressed thereon by the direct-current source 14.

In the course of rotation, the distributing contact arm 69 energizes the ignition transformer of the formerly non-conducting rectifier 8, causing a discharge between the starting electrode 53 and the mercury cathode 21. The rectifier 8 thereupon becomes conducting and the current from the direct-current generator 14 is diverted thereto by the commutating action of the discharge current of the commutating condenser 52, the current through the rectifier 7 being simultaneously reduced to zero. The mercury-arc rectifier 7 thereupon becomes non-conducting and the circuit therethrough is interrupted, while the current now flows through the transformer winding in the opposite direction. This cycle repeats itself alternately in accordance with the operation of the ignition device. By regulating the speed of the distributor 57, the frequency of the generated alternating currents may be controlled.

Figure 5:
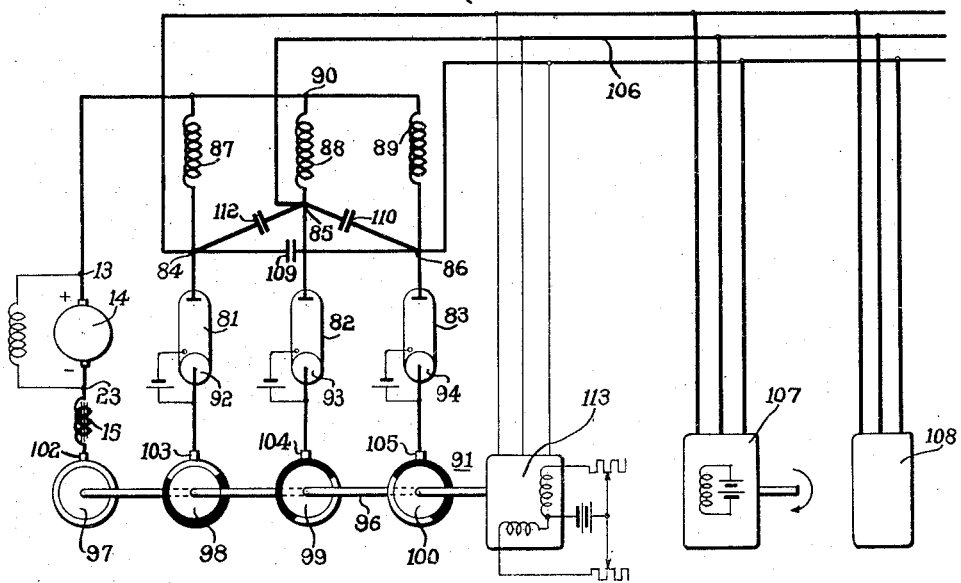
Fig. 5 is a diagrammatic view of a system for supplying a polyphase load by means of apparatus utilizing an arrangement similar to that shown in Fig. 3.

In Fig. 5 is shown an organization for deriving polyphase currents from a direct-current source, which comprises three rectifiers 81, 82 and 83, connected to three end-terminals 84, 85 and 86, respectively, of the three-phase transformer windings 87, 88 and 89 leading to a common terminal 90. A source of direct current, such as the generator 14, has its positive terminal 13 connected to the common terminal 90 of the transformer windings, and its negative terminal 23 connected to a switching device 91 and thence successively to the several mercury electrodes 92, 93 and 94 of the rectifiers 81, 82 and 83, respectively.

The switching device 91 comprises a shaft 96 having mounted thereon four contact members 97, 98, 99 and 100 which are provided with conducting segments co-operating with brushes 102, 103, 104 and 105 leading to the negative terminal 23 of the direct-current source and to the respective mercury electrodes. The conducting segment of the contact member 97 co-operating with the brush leading to the negative terminal of the direct-current generator covers the entire periphery of the contact member, while the conducting segments of the contact members 98, 99 and 100, cover only 120 degrees of the periphery and are displaced against each other by a like angle.

During a full rotation of the shaft 96 the negative terminal of the direct-current source is thus successively connected to the mercury electrodes 92, 93 and 94 of the respective rectifiers. There are intermediate periods of transition during which the conductive connections between the brushes of two contact segments overlap and cause a momentary closed connection between two successively arranged mercury electrodes and the negative terminal 23 of the direct-current generator 14.

A polyphase line 106 is connected across the end terminals 84, 85 and 86 of the transformer windings 87, 88 and 89 and may be connected to a load device 107 and a generating device 108. Commutating condensers 109, 110 and 112 are connected across the end terminals of the transformer windings. The shaft 96 of the switching device 91 is driven by a synchronous motor 113 which is provided with a polyphase exciting winding for adjusting the phase relation of the shaft 96 with respect to the alternations of the polyphase system 106.

The operation of the system for supplying polyphase currents, illustrated in Fig. 5, is analogous to that of the single-phase system illustrated in Figs. 1, 3 and 4. The currents are successively directed to the several mercury-arc rectifiers, either by the action of the commutating condensers 109, 110 and 112 or by the action of the impressed voltage of the polyphase system 106, where the system has means independent of the operation of the device for maintaining a polyphase potential of predetermined frequency.

Figure 6:
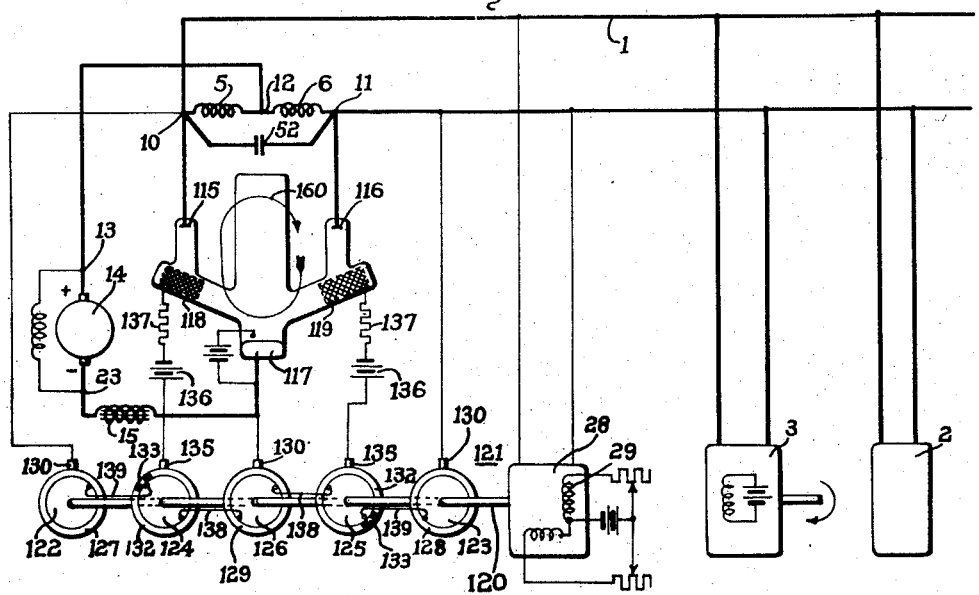
Fig. 6 is a diagrammatic view of a system for supplying single-phase alternating current from a direct-current source by means of a grid-controlled, double-wave mercury-arc rectifier.

In the modification illustrated in Fig. 6, the flow of current through a double-wave mercury rectifier is controlled by means of grids disposed in the space-current paths of the rectifier. The two anodes 115 and 116 of the rectifier are connected to the two end terminals 10 and 11 of a transformer having two windings 5 and 6 provided with a common middle terminal 12 leading to a positive terminal 13 of the direct-current generator 14. The mercury electrode 117 of the rectifier is permanently connected to the negative terminal 23 of the direct-current generator 14 through a stabilizing inductance 15.

Two grids 118 and 119 are provided in the two rectifier paths leading between the mercury cathode 117 and the two anodes 115 and 116, for so controlling the rectifying action and conductivity of the paths as to utilize the direct current flowing from the direct-current generator 14 to supply power to the alternating-current line 1 which is connected across the two end terminals 10 and 11 of the transformer windings 5 and 6.

The construction of the grids and the characteristic phenomena of the control of currents in mercury-arc rectifiers are described and claimed in my Letters Patent 1,731,687, filed October 15, 1923, and dated October 15, 1929, and the Letters Patent 1,856,087 of V. K. Zworykin and D. Ulrey, filed September 28, 1923, and dated May 3, 1932, both assigned to the Westinghouse Electric & Manufacturing Company.

As pointed out in the above-named applications, the mere application, to a grid disposed in the path of the current flow, of a potential opposing the flow of current therethrough, is frequently insufficient to stop a flow of current through a mercury-arc rectifier path through which a current has been initiated previously to the application of such potential. It is essential, for the successful operation of a grid controlled mercury-arc path, that the current therethrough be first reduced to zero before its conductivity can be reduced by the application of a current-blocking potential to the grid. In this respect, the conditions are very similar to those met in the arrangements shown and described in Figs. 1 to 5 when it was required that the current through the rectifier be reduced to zero before the operation of the switching devices, in order to prevent arcing of the latter.

In the organization illustrated in Fig. 6, the potentials of the grids are controlled by a switching device 121 having five annularly-shaped contact members, two contact members 122 and 123 for providing a connection to the anodes 115 and 116, respectively, two contact members 124 and 125 for providing connections to the grids 118 and 119, respectively, and the fifth contact member 126 for providing a connection to the mercury cathode 117 of the rectifier. The contact members 122, 123 and 126, leading to the anodes and to the cathode, respectively, have their entire periphery covered by conducting members or slip-rings 127, 128 and 129, co-operating with brushes 130. The contact members 124 and 125, leading to the two grids, are each provided with a large conducting segment 132 covering almost the entire periphery and a short conducting segment 133 which is insulated from the large conducting segment 132 and covers only a short portion of the periphery. Brushes 135 co-operate with the contact members 124 and 125 and are connected, through biasing batteries 136 and current-limiting resistors 137, to the grids 118 and 119, respectively.

The slip-ring 129 of the contact member 126 leading from the mercury cathode 117 is connected through conductors 138 to the large conducting segments upon the contact members 124 and 125 leading to the grids. The slip rings 127 and 128 leading from the anode members 115 and 116, respectively, are connected by means of conductors 139 to the short conducting segments 133 of the contact members 124 and 125 leading to the grids. The biasing batteries 136 are so arranged that a negative potential is impressed upon the grids whenever the brushes 135 are in contact with the large conducting segments 132 of the contact members 124 and 125, respectively.

The positions of the short conducting segments 133 upon the two grid-control contact members 124 and 125 are displaced 180 degrees with respect to each other so that a contact is established between the brush and the corresponding short segments during opposite half rotations of the shaft 120, thereby effecting a connection between the grid and the anode of the one or the other rectifier arm. The commutating condenser 52 is connected between the end terminals 10 and 11 of the transformer windings in the same manner as in the organizations illustrated in Figs. 3 and 4. A synchronous motor 28, supplied from the load conductors 1 and provided with a polyphase exciter winding, drives the shaft of the switching device 121.

The operation of the system shown in Fig. 6 is analogous to the operation previously described. With the position of the shaft as illustrated in the drawings, the current flows from the positive terminal 13 of the direct-current source to the neutral terminal 12 of the transformer windings, there dividing into two portions, one portion flowing directly through the transformer winding 5 to the end terminal 10, and the other portion flowing through the transformer winding 6 and the load device 3 to the end terminal 10, and thence through the anode 115 and past the grid 118 to the cathode 117 and through the stabilizing inductance 15 to the negative terminal 23 of the direct-current generator 14.

Both of the grids 118 and 119 are charged negatively with respect to the cathode 117, since the brushes 135 are in contact with the longer conducting segments 132 of the grid-control contact members 124 and 125 which lead through the conductors 138 to the cathode 117. However, only the blocking action of the negatively charged grid 119 which is disposed in the non-conducting path is effective to prevent the flow of current. The negatively charged grid 118, which is disposed in the conducting arm of the rectifier, is of almost no effect whatsoever upon the current-flow conditions therein.

In the course of rotation of the shaft 120, the brush 135 leading to the grid 119 of the formerly non-conducting arm of the rectifier comes into contact with the short conducting segment 133 of the contact member 125, momentarily removing the blocking effect of the negtaive charge upon the grid and facilitating a flow of current between the anode 116 and the cathode 117. The commutating condenser 52 which has been previously charged to a potential tending to send a reversed current through the conducting arm towards the anode 115 of the rectifier, discharges and diverts the currents flowing through the anode 115 to the anode 116, whereupon the blocking effect of the negative charge upon the grid 118 becomes fully effective and the rectifier arm leading to the anode 115 becomes in turn non-conductive. This condition lasts until the short conducting segment 133 of the grid control member 124 comes into contact with the brush 135 leading from the grid 118, making that arm of the rectifier conductive again.

By the combined effect of the grid control and the directing action of the commutating condenser 52, the system illustrated in Fig. 6 will produce the same conditions as obtained in the system illustrated in Fig. 3. Instead of employing the commutating condenser, the same directing effect may be obtained by the proper choice of the phase relation between the rotating shaft of the switching device 121 and the alternations of the alternating-current system 1, where such system is provided with independent means for maintaining a definite frequency.

Figure 7:
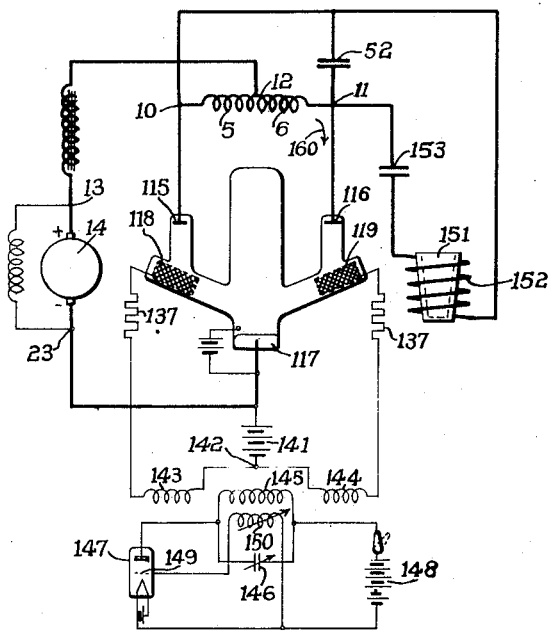
Fig. 7 is a diagrammatic view of a system similar to that illustrated in Fig. 6 but provided with a master oscillator for controlling the potential of the grids.

In Fig. 7 is shown a modification which is similar to that illustrated in Fig. 6 except that it is provided with a master oscillator for controlling the potential of the grids 118 and 119. The mercury cathode 117 is connected through a biasing battery 141 to a common terminal 142 of two secondary transformer windings 143 and 144 leading through current limiting resistors 137 to the grids 118 and 119 respectively. The secondary windings 143 and 144 of the grid control transfomer co-operate with a primary transformer winding 145 which is included in an oscillating circuit with a condenser 146. A three-electrode tube 147 is connected in a circuit including a source of electromotive force, such as a battery 148, across the condenser 146. The grid 149 of the three-electrode tube 147 is connected, through a feed-back coil 150, to the filament and serves to produce sustained oscillations in the circuit including the transformer winding 145 and the condenser 146.

The system illustrated in Fig. 7 is particularly well adapted for producing high-frequency currents such as are utilized in radio applications or for certain industrial purposes such as induction furnaces. I have illustrated an induction furnace comprising a crucible 151 surrounded by an inducing coil 152 which is connected in series with a condenser 153 across the terminals 10 and 11 of the transformer windings 5 and 6.

Figure 8:
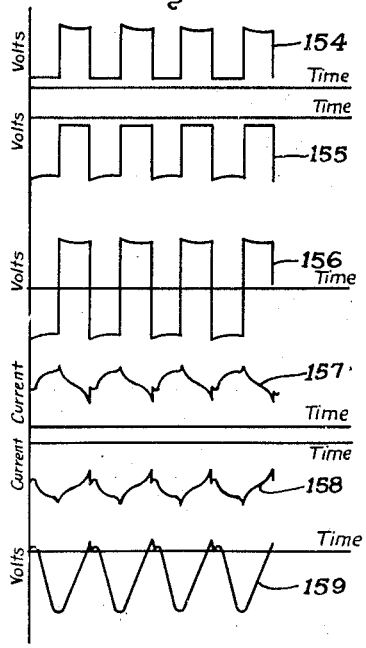
Fig. 8 illustrates curves showing the current and voltage conditions in the apparatus illustrated in Fig. 7.

To illustrate the operation of the system shown in Fig. 7, I have reproduced, in Fig. 8, oscillographic records obtained during the operation thereof. Curve 154 shows the voltage across the rectifier arm 115 as a function of time; curve 155 shows the voltage across the rectifier arm 116 as a function of time; curve 156 shows the voltage between the anodes 115 and 116 as a function of time; curve 157 shows the current through the transformer winding 5 and curve 158 shows the current through the transformer winding 6 as a function of time; and curve 159 shows the voltage between the grid 118 and the mercury cathode 117 as a function of time. In determining the direction of the voltage in the above diagrams, it has been assumed that the voltage in the direction of the arrow 160 from the middle terminal 12 through the anode 116, cathode 117 and anode 115 back to the neutral terminal 12 is positive. In determining the direction of flow of current, it has been assumed that a current flowing in the transformer windings 5 and 6 and in the direction from right to left, that is from the end terminal 11 to the end terminal 10, is positive.

As will be seen from the above-described curves, the voltage across the rectifier arms pulsates from a low value, corresponding to the voltage drop of the rectifier when the arm is conducting, to a full value corresponding to the open-circuit conditions. The current in the transformer winding 5 leading to the conducting rectifier arm increases during the period that the arm is conducting, while the current through the transformer winding 6 leading to the non-conducting arm of the rectifier decreases. The voltage which appears across the two terminals 10 and 11 of the transformer windings 5 and 6, and which is also voltage across the two rectifier anodes 115 and 116, corresponds to the change in flux attendant upon the increase in the current of one transformer winding and the decrease of the current in the other transformer winding, both effects adding to each other since the direction of the currents are opposite. As seen from the above diagrams the current flowing from the direct-current source is divided into two approximately equal portions pulsating around mean values. The sum of both currents is approximately constant and corresponds to the total current flowing from the direct-current source.

It may thus be seen that only approximately half of the current flowing from the direct-generator 14 flows into the alternating-current load circuit. The energy corresponding to the other half of the direct-current flow is utilized in raising the potential across the load circuit to approximately twice the potential of the direct-current generator, by a transformer action in the windings 5 and 6. It is to this end that the windings 5 and 6 are preferably arranged in inductive relation to each other although my system would also operate with two separate transformers or coils.

Figure 9:
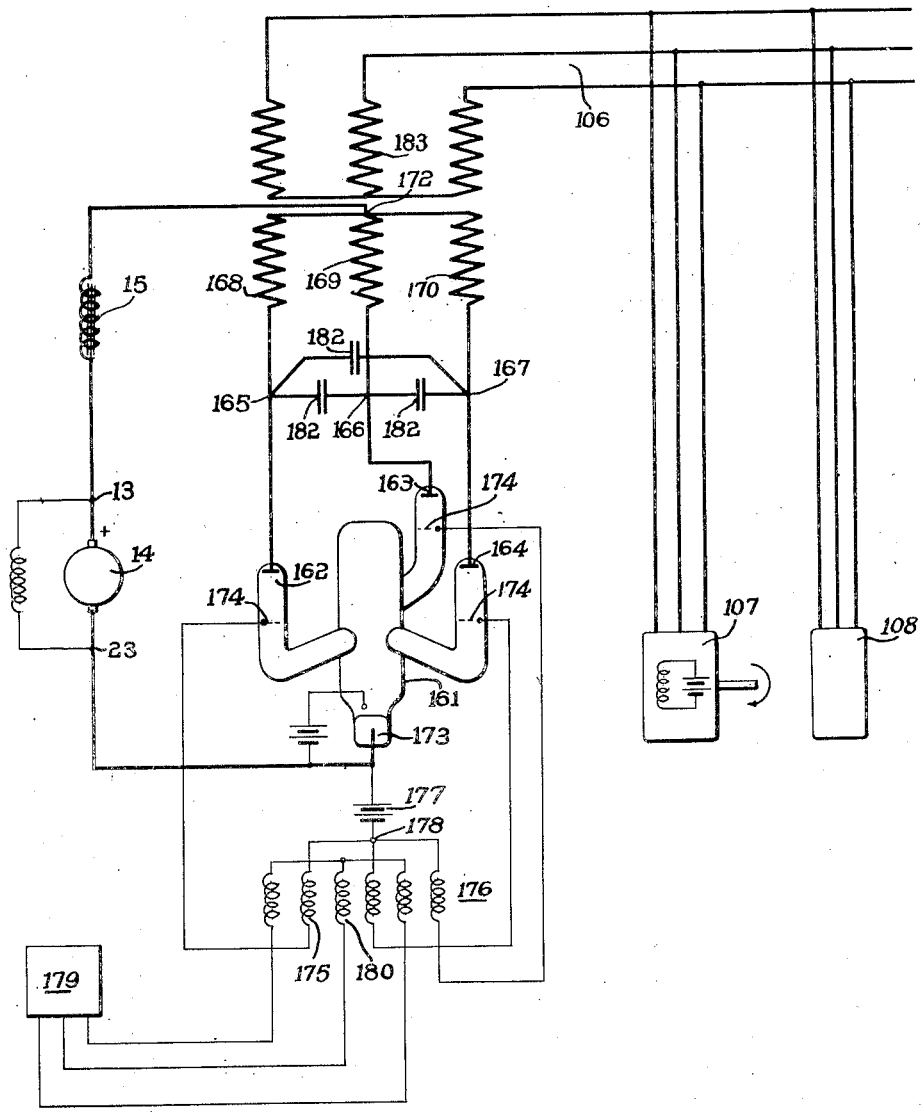
Fig. 9 is a diagrammatic view of a system utilizing a three-arm grid-controlled mercury-arc rectifier for supplying a polyphase load from a direct-current source.

In Fig. 9 is shown a system for generating polyphase currents from a direct-current source by means of a grid-controlled three-arm rectifier 161. Three anodes 162, 163 and 164 of the rectifier are connected to three end terminals 165, 166 and 167 of three transformer windings 168, 169 and 170 leading to a common terminal 172. The direct-current generator 14 has its positive terminal 13 connected to the common terminal 172 of the transformer windings and its negative terminal 23 connected to the mercury cathode 173 of the rectifier.

Each arm of the rectifier has mounted therein a control grid 174 which is connected through a secondary winding 175 of a grid control transformer 176 and a biasing battery 177 to the mercury cathode 173, the three secondary windings 175 of the grid control transformers having a common middle terminal 178. The control potential is supplied to the grids from a master oscillator or other suitable source 179, through primary transformer windings 180 co-operating with the secondary transformer windings 175.

Commutating condensers 182 are connected between the three terminals of the transformer windings 168, 169 and 170, respectively, for diverting the current from one arm of the rectifier to another in the manner described hereinbefore. Secondary transformer windings 183, co-operating with the transformer windings 168, 169 and 170, transmit the alternating current generated by the apparatus to an alternating-current system 106 which may include a load device 107 and a generating device 108.

Fig. 10 is similar to Fig. 4 except that a transformer with separate coils 5—6 and 190 is substituted for the auto-transformer specifically shown in Fig. 4.

The modification illustrated in Fig. 9 is, in principle, very similar to that shown in Fig. 5 and embodies a system wherein grid-controlled mercury-arc paths are utilized to perform the function of the switch device employed in Fig. 5. Through the operation of the commutating condensers 182, which is analogous to that of the commutating condensers shown in Figs. 5 and 7, it is possible to successfully utilize the principles of grid control to generate alternating currents of any frequency.

The apparatus shown in the above-described circuits may also be used to convert electric power of one frequency to another. Fig. 11 shows a modification of Fig. 6 by the operation of which this object is accomplished. In the apparatus shown in Fig. 11, the generator 14 is replaced by a system 200 whereby the electric power of the one frequency which is converted into the other frequency is provided.

In the claims the word "grid" is used. This word is to be taken not in its specific sense as applying to a perforated structure interposed between the anode and the cathode, as for example, the elements 117 and 118 (Fig. 6), but in its general sense as signifying a control electrode of any type, as, for example, the electrode 53 (Fig. 4).

My invention is based on a recognition of the basic principles governing the operation of mercury arcs and the control of currents flowing therethrough, and is not limited to the precise details, arrangements and methods which are described in the specification. Those skilled in the art will readily recognize that my invention may be practically embodied in many other ways without departing from the spirit thereof and I desire, therefore, that only such limitations shall be placed thereon as are imposed by the prior art or set forth in the appended claims.

I claim as my invention:

1. In combination, a source of direct current, a winding connected to said source through a vapor electric device, said vapor device having an anode and a cathode, means including an auxiliary starting anode within said vapor device for starting an arc therein to thereby cause current to flow from said anode to said cathode, and means for periodically energizing said starting means.

2. In combination a source of direct current, a winding connected to said source through a plurality of vapor electric devices, said vapor devices each having an anode and a cathode, starting means for each of said vapor devices, said means including a transformer, an auxiliary starting anode connected to said transformer and means for periodically energizing said transformer.

3. In combination a source of direct current, a winding connected to said source through a plurality of vapor electric devices, said vapor devices each having an anode and a cathode, means including an auxiliary starting anode associated with each of said vapor devices for starting an arc therein, and means for alternately energizing the starting means associated with each vapor device.

4. In combination a source of direct current, a winding connected to said source through a vapor electric device, said vapor electric device having an anode, a cathode, and an auxiliary starting anode, means for controlling the action of said vapor electric device to supply current impulses to said winding, said means including a winding connected to said cathode and auxiliary anode, and means for periodically energizing said last mentioned winding.

5. In combination a source of direct current, a primary winding connected to said source through a plurality of vapor electric devices, a secondary winding inductively related to said primary winding, each of said vapor devices having an anode and a cathode, means including an auxiliary starting electrode associated with each vapor device for starting an arc therein, and means for alternately and periodically energizing said starting means to thereby control the flow of current impulses to said primary winding.

6. In combination a source of direct current, a winding connected to said source through a plurality of vapor electric devices, each of said vapor devices having an anode and a cathode, means including an auxiliary starting electrode associated with each vapor device for starting an arc therein, and means for alternately and periodically energizing said starting means to thereby control the flow of current impulses to said winding.

7. In combination, a source of direct current, an alternating current network connected to said source through a vapor electric device, said vapor device having an anode and a cathode, means including an auxiliary starting anode within said vapor device for starting an arc therein to thereby cause current to flow from said anode to said cathode, and means for periodically energizing said starting anode with a peaked voltage.

8. In combination, a source of direct current, an alternating current network connected to said source through a plurality of vapor electric devices, said vapor devices each having an anode and a cathode, starting means for each of said vapor devices, said means including a transformer, an auxiliary starting anode connected to said transformer and means for periodically energizing said transformer.

9. In combination, a source of direct current, an alternating current network connected to said source through a plurality of vapor electric devices, said vapor devices each having an anode and a cathode, means including an auxiliary starting anode associated with each of said vapor devices for starting an arc therein and means for alternatively energizing the starting means associated with each vapor device.

10. In combination, a source of direct current, an alternating current network connected to said source through a vapor electric device, said vapor electric device having an anode, a cathode and an auxiliary starting electrode, means for controlling the action of said vapor electric device to supply current impulses to said alternating current network, said means including a winding connected to said cathode and auxiliary electrode and means for periodically energizing said last mentioned winding.

11. In combination, a source of direct current, an alternating current network connected to said source through a plurality of vapor electric devices, each of said vapor electric devices having an anode and a cathode, means including an auxiliary starting electrode associated with each vapor device for starting an arc therein, and means for alternately and periodically energizing said starting means to thereby control the flow of current impulses to said alternating current network.

12. In combination, an electric translation circuit including an alternating current circuit and a discontinuous control electric valve provided with an anode, a cathode, and a grid for controlling the current conducted thereby, and a circuit connecting said grid and said cathode including a negative bias potential and a source of periodic positive potential impulses of peaked wave form and substantially greater in amplitude than said bias potential for only a small fraction of a cycle for determining the point in the cycle of alternating current at which said valve is rendered conductive.

13. In combination, an electric translation circuit including an alternating current circuit and a discontinuous control electric valve provided with an anode, a cathode and a control grid, a circuit connecting said grid and said cathode including a negative bias potential to render said electric valve normally non-conducting, and a source of periodic positive potential impulses of a relatively short time duration and of an amplitude sufficient to exceed substantially said bias potential in spite of normal variations in said potentials to determine the point in the cycle of alternating current at which said valve is rendered conductive.

14. The combination of a plurality of discontinuous control electric valves each provided with an anode, a cathode and a control grid, a capacitor, a capacitor charging circuit including one of said valves, a capacitor discharging circuit including another of said valves, an alternating current circuit common to said charging and discharging circuits, means for successively rendering said valves conducting at intervals of substantially one half cycle comprising grid circuits for said valves including sources of periodic potential opposite in phase and of a peaked wave form.

15. The combination of a plurality of discontinuous control electric valves, each provided with an anode, a cathode, and a control grid, a capacitor, a capacitor charging circuit including one of said valves, a capacitor discharging circuit including another of said valves, an alternating current circuit common to said charging and discharging circuits, means for successively rendering said valves conducting comprising grid circuits for said valves including sources of pulsating potential opposite in phase, and means for initiating operation of said apparatus, said sources of potential having a peaked wave form whereby current will flow through the valve first made conducting for substantially a half cycle before the second valve is made conducting, irrespective of the time of operation of said initiating means.

16. The combination of a plurality of discontinuous control electric valves each provided with an anode, a cathode and a control element, a capacitor, a capacitor charging circuit including one of said valves, a capacitor discharging circuit including another of said valves, an alternating current circuit common to said charging and discharging circuits, means for successively rendering said valves conducting at intervals of substantially one half cycle comprising circuits for the control elements of said valves including sources of periodic potential opposite in phase and of a peaked wave form.

17. The combination of a plurality of discontinuous control electric valves, each provided with an anode, a cathode and a control element, a capacitor, a capacitor charging circuit including one of said valves, a capacitor discharging circuit including another of said valves, an alternating current circuit common to said charging and discharging circuits, means for successively rendering said valves conducting comprising circuits for the control elements of said valves including sources of periodic potential opposite in phase, and means for initiating operation of said apparatus, said sources of potential having a peaked wave form whereby current will flow through the valve first made conducting for substantially a half cycle before the second valve is made conducting, irrespective of the time of operation of said initiating means.

18. In combination, an electric translation circuit including an alternating current circuit and a discontinuous control electric valve provided with an anode, a cathode and a control electrode for controlling the current through said valve, a source of periodic potential for exciting said control electrode, and inductive means interposed between said source and said control electrode for converting said periodic potential to one of peaked wave form for rendering said valve conductive.

19. In combination, an electric translation circuit including an alternating current circuit and a discontinuous control electric valve provided with an anode, a cathode and a control electrode for controlling the current through said valve, a source of periodic potential for exciting said control electrode, and inductive means interposed between said source and said control electrode for converting said periodic potential to one having a substantially perpendicular wave front for rendering said valve conductive.

20. In combination, an electric translation circuit including an alternating current circuit and a discontinuous control electric valve provided with an anode, a cathode and an element for controlling the current through said valve, a source of periodic potential for exciting said control element, and inductive means interposed between said source and said element for converting said periodic potential to one of peaked wave form for rendering said valve conductive.

21. In combination, an electric translation circuit including an alternating current circuit and a discontinuous control electric valve provided with an anode, a cathode, and a grid for controlling the current conducted thereby, and a circuit connecting said grid and said cathode including a negative bias potential and a source of periodic positive potential impulses of peaked wave form and having an amplitude which for only a small fraction of a cycle is of such magnitude relative to said bias potential as to render said valve conductive for determining the point in the cycle of alternating current at which said valve is rendered conductive.

22. In combination, an electric translation circuit including an alternating current circuit and a discontinuous control electric valve provided with an anode, a cathode, and a grid for controlling the current conducted thereby, and a circuit connecting said grid and said cathode including a negative bias potential and a source of periodic positive potential impulses of peaked wave form and substantially equal in amplitude to the difference of potential between said anode and said cathode for only a small fraction of a cycle for determining the point in the cycle of alternating current at which said valve is rendered conductive.

23. In combination with electric current rectifier of the vapor arcing type having an anode, and a control electrode, input and output circuits, and means impressing alternating current potentials on said anode, of means for impressing on said control electrode voltage waves having wave fronts steeper than the corresponding portions of sinusoidal voltage waves of the same amplitude as said voltage waves and of the same frequency as said A. C. potentials, and means for impressing D. C. potentials on said electrode.

24. The method of controlling the output of a vapor electric discharge device which encloses an anode, a cathode, and a control electrode, which comprises impressing a periodic potential upon said anode, normally impressing upon said control electrode a potential tending to maintain said discharge device nonconductive, and abruptly varying the potential impressed upon said control electrode at the point in the cycle of said anode potential corresponding to the desired output of said discharge device and in such a sense as to render said discharge device conductive at said point.

25. The method of controlling the output of an electric discharge device incorporating at least a single cathode, a plurality of anodes and a control electrode associated with each anode all in a single vessel, said device being of the type wherein the path between either of said anodes and said cathode is in excited condition by a current transmitted therebetween when the potential impressed between said anode and said cathode bears a predetermind relationship to the potential impressed between the corresponding control electrode and said cathode, and is in an unexcited condition when the potential impressed between said anode and said cathode bears another relationship to the potential impressed between the corresponding control electrode and said cathode, the transition from said unexcited condition to said excited condition being abrupt as the relationship between said potentials is varied through a predetermined limiting relationship; which comprises the steps of impressing potentials that vary in magnitude with a predeterminad periodicity between each anode and said cathode, normally impressing potentials between each control electrode and said cathode that are so related to the potentials impressed between said anodes and said cathode that the paths between said anodes and said cathode are in unexcited condition and abruptly varying the potential impressed between each individual control electrode and said cathode in its turn, precisely at a point in the cycle of potential impressed between the corresponding anode and said cathode that corresponds to the desired output of said electric discharge device, in such a sense that the corresponding path is excited and a pulse of current is transmitted therethrough the magnitude of which corresponds to the desired output of said electric discharge device.

26. In combination, a first circuit, a second circuit, said second circuit being of the alternating type, and interconnecting means between said circuits providing for the supply of current from said first circuit to said second circuit and including a discontinuous control electric valve provided with an anode, a cathode, and a grid for controlling the current conducted thereby, and a circuit connecting said grid and said cathode including a negative bias potential and a source of periodic positive potential impulses of peaked wave form having the frequency of said second circuit and being substantially greater in amplitude than said bias potential for only a small fraction of a cycle of said second circuit for determining the point in the cycle of said second circuit at which said valve is rendered conductive.

27. In combination, a first circuit, a second circuit, said second circuit being of the alternating type, and interconnecting means between said circuits providing for the supply of current from said first circuit to said second circuit and including a discontinuous control electric valve provided with an anode, a cathode and a control grid, a circuit connecting said grid and said cathode including a negative bias potential to render said electric valve normally non-conducting, and a source of periodic positive potential impulses of the frequency of said second circuit, of a relatively short time duration and of an amplitude sufficient to exceed substantially said bias potential in spite of normal variations in said potentials to determine the point in the cycle of said second circuit at which said valve is rendered conductive.

28. In combination, a first circuit, a second circuit, said second circuit being of the alternating type, and interconnecting means between said circuits providing for the supply of current from said first circuit to said second circuit and including a discontinuous control electric valve provided with an anode, a cathode, and a grid for controlling the current conducted thereby, and a circuit connecting said grid and said cathode including a negative bias potential and a source of periodic positive potential impulses of the frequency of said second circuit, of peaked wave form and having an amplitude which for only a small fraction of a cycle of said second circuit is of such magnitude relative to said bias potential as to render said valve conductive for determining the point in the cycle of said second circuit at which said valve is rendered conductive 29. In combination, a first circuit, a second circuit, said second circuit being periodic, and interconnecting means between said circuits providing for the supply of current from said first circuit to said second circuit and including a discontinuous control electric valve provided with an anode, a cathode, and a grid for controlling the current conducted thereby, and a circuit connecting said grid and said cathode including a negative bias potential and a source of periodic positive potential impulses of the frequency of said second circuit, of peaked wave form and substantially equal in amplitude to the difference of potential between said anode and said cathode for only a small fraction of a cycle of said second circuit for determining the point in the cycle of said second circuit at which said valve is rendered conductive.

30. In combination with an electric current rectifier of the vapor arcing type having an anode, and a control electrode, an input circuit, an output circuit, said output circuit being of the alternating type, and means coupled to said circuits impressing alternating current potentials on said anode, of means for impressing on said control electrode voltage waves having wave fronts steeper than the corresponding portions of sinusoidal voltage waves of the same amplitude as said voltage waves and of the same frequency as said alternating current potentials, and means for impressing direct current potentials on said electrode.

31. In combination with an electric current rectifier of the vapor arcing type having an anode, and a control electrode, an input circuit, an output circuit, said output circuit being of the alternating type, and means coupled to said circuits impressing alternating current potentials of the same frequency as that of said output circuits on said anode, of means for impressing on said control electrode voltage waves having wave fronts steeper than the corresponding portions of sinusoidal voltage waves of the same amplitude as said voltage waves and of the same frequency as said alternating current potentials, and means for impressing direct current potentials on said control electrode.

32. In combination, a first circuit, a second circuit, said second circuit being of the periodic type, means interconnecting said circuit providing for the transfer of power from said first circuit to said second circuit and including an electric discharge path of the arc-like discharge type having a plurality of principal electrodes and a control electrode, an oscillation generator for producing oscillations of the frequency of said second circuit and having input and output circuits and means for coupling said output circuit between said control electrode and one of said principal electrodes.

33. The combination, in a system of electrical distribution, of a source of direct current, a primary winding connected to said source through a continuously excited vapor-electric device, said vapor-electric device comprising an anode, a cathode and a grid, a secondary winding inductively associated with the primary winding, means for controlling the grid potential, and means associated with said controlling means for providing said grid with a negative bias.

34. The combination in a system of electrical distribution, of a source of direct current, a winding connected to said source through a continuously excited vapor-electric device, said vapor electric device comprising an anode, a cathode and a grid, an alternating current network inductively associated with said winding, means for controlling the grid potential and means associated with said controlling means for providing said grid with a negative bias.

35. The combination in a system of electrical distribution, of a source of direct current, a winding connected to said source through a continuously excited vapor electric device, said vapor electric device comprising an anode, a cathode and a grid, an alternating current network inductively associated with said winding, means for controlling the grid potential and means associated with said controlling means for providing said grid with a negative bias, said controlling means also having means for periodically removing the negative charge on said grid at the frequency of said alternating current and for varying the point in the cycle of said alternating current at which said removal occurs.

36. The combination in a system of electrical distribution, of a source of direct current, a winding connected to said source through a continuously excited vapor electric device, said vapor electric device comprising an anode, a cathode and a grid, an alternating current network inductively associated with said winding, means for controlling the grid potential and means associated with said controlling means for providing said grid with a negative bias, said controlling means also having means for periodically and momentarily removing the negative charge on said grid.

37. The combination in a system of electrical distribution, of a source of direct current, a winding connected to said source through a continuously excited vapor electric device, said vapor electric device comprising two anodes, a grid for each anode and a cathode, an alternating current network inductively associated with said winding, means for controlling the potential of said grids including means for providing said grids with a negative bias and means for alternatively and periodically removing the negative charge on said grids.

38. Oscillation generating apparatus comprising a condenser, a source of voltage, means for periodically charging said condenser by voltage obtained from said source, means for discharging said condenser, said charging means including a gas tube having electrodes in circuit with said source and said condenser, and non-reactive means for ionizing the gas within the tube.

39. The combination of a three-element gas tube having two of its electrodes forming an input circuit and the third electrode and one of the other electrodes forming an output circuit, a source of voltage connected to the input circuit electrodes, the magnitude of the voltage of said source being greater than that required to ionize the gas between said input circuit electrodes, a coil, and a condenser connected in shunt with said coil to the output circuit electrodes of the tube, the output circuit supplying substantially no voltage to the input circuit.

40. In combination, a gaseous discharge tube having an anode and a cathode, a condenser arranged to be charged from a source of electricity connected to said anode and said cathode, a control electrode for rendering said tube conductive, and means including a vacuum tube connected to said control electrode for controlling the discharge of said condenser through said gaseous discharge tube.

41. Apparatus of the character described having, in combination, an impedance, a capacitor, means connecting the impedance and the capacitor with a source of energy to charge the capacitor from the source through the impedance, a luminescent-discharge device provided with a control grid, the device having a cathode adapted to emit electrons under the control of the grid, and means comprising a vacuum tube controlling the operation of the grid for controlling the discharge of the condenser through the device.

42. Apparatus of the character described having, in combination, a capacitor, means for connecting the capacitor with a source of energy to charge the capacitor from the source, a luminescent-discharge device, a discharge circuit connecting the capacitor and the device, and means including an electric-discharge device for causing a surge of current to flow in the discharge circuit.

43. Apparatus of the character described having, in combination, a capacitor, means connecting the capacitor with a source of energy to charge the capacitor from the source, a luminescent-discharge device having a control grid, a grid-controlled, electron-discharge device, a circuit in which the electron-discharge device is connected, means controlled by the electron-discharge device for causing a surge of current to flow in the said circuit to the said control grid, and means controlled by the said control grid to cause the capacitor to discharge through the luminescent-discharge device.

44. Apparatus of the character described having, in combination, a luminescent-discharge device, a condenser connected with said device and adapted to be charged from a source of electric energy, a tube having a control circuit and an output circuit, and means connected with the control circuit and operating through the output circuit for rendering the tube effective to cause the condenser to discharge through the discharge device.

45. Apparatus of the character described having, in combination, a mercury tube having a mercury-pool cathode, a condenser connected with the tube and adapted to be charged from a source of electric energy, a tube having a control circuit and an output circuit, and means connected with the control circuit for rendering the second-named tube effective to subject the cathode to the potential of the output circuit to cause the condenser to discharge through the mercury tube.

46. In combination, a source of electric energy, a condenser connected with the source so as to be charged from the source, a transformer having a primary winding and a secondary winding, a vacuum tube in circuit with said primary winding, said tube having a control grid, a mercury tube having a control electrode connected with the condenser, the mercury of which is subjected to the potential of the secondary winding being impressed between said control electrode and said mercury, and means connected to said grid for causing the condenser to discharge through the mercury tube.

47. In combination, a capacitor connected with a source of direct current, whereby energy from the source is fed to the capacitor to charge the capacitor, a luminescent-discharge tube provided with an anode, a cathode and a control grid, means connecting the anode with a terminal of the source and a terminal of the capacitor and connecting the cathode with the other terminal of the source and the other terminal of the capacitor to produce, during the said charging of the capacitor from the source, a difference of potential between the cathode and the anode, with the anode positive with respect to the cathode, the tube being sufficiently exhausted so that it will not conduct current during the said charging of the capacitor, and means including a grid-controlled, discharge tube for controlling the grid of the luminescent-discharge tube to control the emission of electrons from the cathode.

48. In combination with apparatus of the type in which a condenser is periodically discharged through a gaseous-conductor discharge device having a control electrode and a principal electrode, means for initiating discharge of the condenser at selected intervals consisting of an inverter for producing electrical impulses at a controlled rate, said inverter comprising a grid-controlled device for producing electrical impulses connected in circuit with a source of potential and with means for varying the impulse rate, and means for inpressing such impulses between said control electrode and said principal electrode.

49. In combination with apparatus adapted for excitation by electrical impulses, means for exciting such apparatus comprising a condenser, a source of energy for charging the condenser, means connected in series circuit with the energy source and with the condenser for charging the condenser comprising an electric check valve and an inductance, means for discharging the condenser at selected intervals, and means for conveying to the apparatus the voltage impulse which occurs at the instant that current ceases to flow through said electric check valve.

50. In combination, a gaseous conductor device having at least three electrodes of the type in which an electric discharge between two main electrodes may be initiated by changing the potential of the third electrode, a condenser shunted across the main electrodes, means for charging said condenser comprising a source of current, an inductance and an electric check valve connected in series, and means for varying the potential of said third electrode to cause said condenser to discharge through said device.

51. Apparatus of the type defined in claim 48 in which the inverter includes a second condenser arranged in series circuit with the device and the source of potential.

52. In combination with apparatus of the type in which a condenser is periodically discharged through a gaseous-conductor electric discharge device having a control electrode and a principal electrode, means for initiating discharge of the condenser at selected intervals consisting of an inverter for producing electrical impulses comprising a grid-controlled device for producing electrical impulses in series circuit with a source of potential and with a second condenser, means for varying the impulse rate, and means for impressing such impulses between said control electrode and said principal electrode.

53. In combination with apparatus of the type in which a condenser is periodically discharged through a gaseous-conductor electric discharge device having a control electrode and a principal electrode, means for initiating discharge of the condenser at selected intervals comprising a discharge device connected in circuit with a source of potential and with means for varying the impulse rate, and means for impressing such impulses between said control electrode and said principal electrode.

54. An inverter comprising a condenser, a source of potential for charging the condenser, means connected in series circuit with the energy source and with the condenser for charging the condenser comprising an electric check valve and an inductance, means for discharging the condenser comprising a gaseous-discharge device having at least three electrodes and of the type in which the maximum potential which can be established between two main electrodes without appreciable current flow therebetween may be controlled by controlling the potential between one of said main electrodes and a third electrode, said condenser-discharge means also including means for impressing between the third electrode and one of the main electrodes of said gaseous-conductor device the voltage impulse which occurs at the instant current ceases to flow through said electric check valve.

55. In combination, a condenser, a source of potential for charging the condenser, means for charging the condenser comprising an inductance and an electric check valve connected in series circuit with the energy source and with the condenser, and means for discharging the condenser at selected intervals.

56. Apparatus of the type defined in claim 53 including a second condenser arranged in series circuit with the discharge device and the source of potential.

57. In combination with apparatus of the type in which a condenser is periodically discharged through a gaseous-conductor electric discharge device having a control electrode and a principal electrode, means for initiating discharge of the condenser at selected intervals comprising a discharge device in series circuit with a source of potential and with a second condenser, means for varying the impulse rate, and means for impressing such impulses between said control electrode and said principal electrode.

58. In combination, a condenser, a direct current source of potential for charging the condenser, means for charging the condenser to a predetermined potential higher than the potential of the energy source, said means comprising an inductance and an electric check valve connected in series circuit with the energy source and with the condenser, and means for discharging the condenser at selected intervals.

59. In combination, a gaseous-conductor device having at least three electrodes of the type in which an electric discharge between two main electrodes may be initiated by changing the potential of the third electrode, a condenser shunted across the main electrodes, means for charging said condenser comprising a source of direct current, an inductance and an electric check valve connected in series, and means for varying the potential of said third electrode to cause said condenser to discharge through said device.

60. In combination, a trigger-tube device, a condenser shunted across two electrodes of said device, means for charging the condenser comprising a source of direct current and an electric check valve and an inductance forming with the condenser an oscillating circuit, and means for applying a discharge-initiating stimulus to said trigger tube to cause said condenser to discharge through said device.

61. In combination, a condenser, means for charging the condenser, comprising a source of direct current and a conductor having resistance and inductance of such magnitude relative to the capacity of the condenser that the charging circuit is an oscillating circuit, such means being adapted to develop a maximum condenser voltage not substantially higher than the condenser voltage which exists at the instant immediately preceding the discharge of the condenser and means for discharging the condenser at selected intervals.

62. In combination, a gaseous-conductor device having at least three electrodes of the type in which an electric discharge between two main electrodes may be initiated by changing the potential of the third electrode, a condenser shunted across the main electrodes, means for charging said condenser comprising an oscillating circuit which includes a source of current, an inductance and an electric check valve connected in series with said condenser, and means for varying the potential of said third electrode to cause said condenser to discharge through said device.

63. In combination, a luminescent discharge device having a control electrode and a plurality of principal electrodes and having rectifier characteristics, an oscillatory circuit including said principal electrodes, means for causing a surge of current to flow through said principal electrodes, and means including a grid-controlled discharge rectifier tube for producing an initiating surge of current between said control electrode and one of said principal electrodes.

64. In combination, a luminescent-discharge device having a starting electrode, a condenser connected to said device arranged to be charged from a source of electric energy, a transformer having a primary winding and a secondary winding connected with the starting electrode, a grid-controlled discharge rectifier tube having a grid, a second condenser arranged to be charged from a source of electric energy in series with the rectifier tube and the primary of the transformer, and means connected with the grid of said rectifier tube for causing said second condenser to discharge through said primary winding, thereby causing said first condenser to discharge through said discharge device.

65. In combination, a source of electric energy, a condenser connected with the source so as to be charged from the source, a transformer having a primary winding and a secondary winding, a vacuum tube having a control grid, a second condenser arranged to be charged from a source of electric energy connected in series with said tube and said primary winding, a mercury tube connected in series with the first condenser, the mercury of which is subjected to the potential of the secondary winding, and means connected to said grid for causing the second condenser to discharge through the primary winding, thereby causing the first condenser to discharge through the mercury tube.

66. In combination, a tube having an anode, a mercury-pool cathode and a starting electrode, a condenser connected between the anode and the cathode, means for charging the condenser, a transformer having a primary winding and a secondary winding, means connecting the secondary winding between the cathode and the starting electrode, a grid-controlled discharge tube connected in circuit with the primary winding, and means for intermittently opening and closing the circuit to render the circuit intermittently effective to energize the transformer intermittently to cause the secondary winding to energize the starting electrode intermittently, whereby the condenser will become enabled to discharge intermittently between the cathode and the anode.

67. In combination, a gaseous-discharge tube having an anode, a cathode and a starting electrode, a condenser connected between the anode and the cathode, means for charging the condenser, a grid-controlled discharge tube for controlling the starting electrode, the discharge tube having an input circuit and an output circuit in which the condenser is connected, and means for intermittently controlling the input circuit to energize the starting electrode intermittently, whereby the condenser will become enabled to discharge intermittently between the cathode and the anode.

68. In combination with apparatus adapted for excitation by electrical impulses, means for exciting such apparatus comprising a condenser, a source of energy for charging the condenser, means connected in series circuit with the energy source and with the condenser for charging the condenser to a potential higher than the potential of the energy source, said means comprising an electric check valve and an inductance forming with the condenser a slightly damped oscillating circuit, means for discharging the condenser at selected intervals, and means for conveying to the apparatus the voltage impulse which occurs at the instant that current ceases to flow through said electric check valve.

69. In combination, a condenser, a source of potential for charging the condenser, means for charging the condenser to a predetermined potential higher than the potential of the energy source, said means comprising an inductance and an electric check valve connected in series circuit with the energy source and with the condenser, and means for discharging the condenser at selected intervals.

70. In combination, a trigger tube, a condenser shunted across two electrodes of said device, means for charging the condenser comprising a source of current and an electric check valve and an inductance forming with the condenser an oscillating circuit, and means for applying a discharge initiating stimulus to said trigger tube to cause said condenser to discharge through said device.

71. In combination, a discharge device of the arc-like discharge type having a plurality of principal electrodes and a control electrode, means for controlling the discharge between said principal electrodes including an oscillation generator having input and output circuits, and means for coupling said output circuit between said control electrode and one of said principal electrodes, the potential impressed between said control electrode and said one principal electrode from said output circuit during each period of the oscillations of said generator being sufficient to render said device conductive, and means for rendering said device non-conductive after it has been rendered conductive, during each said period.

72. In combination an electric discharge device, a condenser; a discharge circuit including said condenser and said discharge device; an impedance, a rectifier tube; means for charging said condenser including a circuit having a source of direct current, said impedance and said rectifier tube; and means for causing said condenser to discharge suddenly through said discharge device at predetermined intervals of time.

73. In combination an electric discharge device, a condenser, a discharge circuit including said condenser and said discharge device, a grid-controlled discharge device, a charging circuit for said condenser including a source of energy and the grid-controlled discharge device, means including an auxiliary circuit connected to said charging circuit for causing said condenser to be charged, and means for subsequently causing said condenser to discharge through said discharge device.

74. In combination an electric discharge device; a condenser; a discharge circuit including said condenser and said discharge device; an impedance, a grid controlled gas tube, means for charging said condenser including a circuit having a source of direct current, said impedance and said grid controlled gas tube; and means for causing said condenser to discharge suddenly through said discharge device at predetermined intervals of time.

75. In combination an electric discharge device, a condenser, a discharge circuit including said condenser and said discharge device, an electron-discharge device having a control grid, a charging circuit for said condenser including a source of energy and said electron-discharge device, a transformer having a primary winding and a secondary winding connected to said control grid, and means for causing said condenser to discharge through said electric discharge device, said means including means for causing a surge of current to flow through the primary winding of the transformer.

76. The combination in a system of electrical distribution, of a source of direct current, a winding connected to said source through a continuously excited vapor electric device, said vapor electric device comprising an anode, a cathode and a grid, an alternating current network inductively associated with said winding, means for controlling the grid potential and means associated with said controlling means for providing said grid with a negative bias, said controlling means also having means for periodically removing the negative charge on said grid.

77. For use in transferring power between a first circuit and a second circuit at least one of said circuits having a source of potential, the combination comprising an electric discharge valve having a plurality of principal electrodes and mechanical switching means interposed in series between said circuits, said valve being rendered conductive by the potential from said source when said switching means is closed, means for rendering said valve non-conductive and means for opening said switching means, the operation of said rendering means and said opening means being so timed that said valve is rendered non-conductive before said switching means is opened.

78. For use in transferring power between a first circuit and a second circuit at least one of said circuits having a source of potential, the combination comprising an electric discharge valve having a plurality of principal electrodes and mechanical switching means interposed in series between said circuits, said valve being rendered conductive by the potential from said source when said switching means is closed, means for rendering said valve non-conductive and means for opening said switching means, the operation of said rendering means and said opening means being so timed that said valve is rendered non-conductive for a short time before said switching means is opened.

79. For use in transferring power between an alternating-current circuit and a direct-current circuit at least one of said circuits having a source of potential, the combination comprising an electric discharge valve having a plurality of principal electrodes and mechanical switching means interposed in series between said circuits, said valve being rendered conductive by the potential from said source when said switching means is closed, means for rendering said valve non-conductive and means operating in synchronism with the current flow in said alternating-current circuit for opening and closing said switching means, the operation of said rendering means and said opening and closing means being so timed that said valve is rendered non-conductive before said switching means is opened.

80. For use in transferring power between an alternating-current circuit and a direct-current circuit at least one of said circuits having a source of potential, the combination comprising an electric discharge valve having a plurality of principal electrodes and mechanical switching means interposed in series between said circuits, said valve being rendered conductive by the potential from said source when said switching means is closed, means responsive to the potential of said circuits for rendering said valve non-conductive and means operating in synchronism with the current flow in said alternating-current circuit for opening and closing said switching means, the operation of said rendering means and said opening and closing means being so timed that said valve is rendered non-conductive before said switching means is opened.

81. For use in transferring power between an alternating-current circuit and a direct-current circuit at least one of said circuits having a source of potential, the combination comprising an electric discharge valve having a plurality of principal electrodes and mechanical switching means interposed in series between said circuits, said valve being rendered conductive by the potential from said source when said switching means is closed, means responsive to the potential of said circuits for rendering said valve non-conductive and means operating in synchronism with the current flow in said alternating-current circuit for opening and closing said switching means, the operation of said rendering means and said opening and closing means being so timed that said valve is rendered non-conductive for a short time compared to a half period of the frequency of said alternating-current circuit before said switching means is opened.

82. For use in transmitting power from an alternating-current circuit a direct-current circuit, the combination comprising an electric discharge valve having a plurality of principal electrodes, mechanical switching means interposed in series between said circuits, and means for periodically closing said switching means in synchronism with the potential of said alternating-current circuit at instants in the half periods of the potential of said alternating-current circuit which are predeterminable at will, and means for opening said switching means after the current flow through said valves produced by the closing of said switching means has decreased to zero.

JOSEPH SLEPIAN.